United States Patent
Chang et al.

(10) Patent No.: US 9,882,494 B2
(45) Date of Patent: Jan. 30, 2018

(54) SWITCHING-MODE POWER SUPPLIES CAPABLE OF OPERATING AT VALLEY SWITCHING, AND RELEVANT CONTROL METHODS

(71) Applicant: Leadtrend Technology Corporation, Zhubei, Hsinchu County (TW)

(72) Inventors: Chih Chi Chang, Zhubei (TW); Ming Chang Tsou, Zhubei (TW); Meng Jen Tsai, Zhubei (TW)

(73) Assignee: LEADTREND TECHNOLOGY CORPORATION, Zhubei, Hsinchu County (TW)

( * ) Notice: Subject to any disclaimer, the term of this patent is extended or adjusted under 35 U.S.C. 154(b) by 0 days.

(21) Appl. No.: 15/407,338

(22) Filed: Jan. 17, 2017

(65) Prior Publication Data

US 2017/0214325 A1    Jul. 27, 2017

(30) Foreign Application Priority Data

Jan. 22, 2016    (TW) .............................. 105102001 A

(51) Int. Cl.
*H02M 3/335* (2006.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 2001/0009* (2013.01)

(58) Field of Classification Search
CPC ........... H02M 1/08; H02M 2001/0012; H02M 3/157; H02M 3/33515

USPC ........ 323/222; 363/21.12, 21.132, 21.16, 95, 363/97
See application file for complete search history.

(56) References Cited

U.S. PATENT DOCUMENTS

| | | | |
|---|---|---|---|
| 2012/0049822 A1 | 3/2012 | Li et al. | |
| 2013/0100711 A1* | 4/2013 | Langeslag | H02M 3/33507 363/21.12 |
| 2013/0181635 A1* | 7/2013 | Ling | H02M 3/33507 315/297 |
| 2014/0029316 A1* | 1/2014 | Adragna | H02M 3/33523 363/21.18 |
| 2016/0111961 A1* | 4/2016 | Balakrishnan | H02M 3/33507 363/21.12 |
| 2016/0241150 A1* | 8/2016 | Hsu | H02M 3/33523 |

(Continued)

FOREIGN PATENT DOCUMENTS

WO    2013/034517 A1    3/2013

*Primary Examiner* — Jeffrey Sterrett
(74) *Attorney, Agent, or Firm* — McClure, Qualey & Rodack, LLP

(57) ABSTRACT

Control methods and related power controllers diminish audible noise in a power supply capable of performing valley switching. The power supply has an inductive device and a power switch. When the power switch is OFF, a winding voltage of the inductive device oscillates to provide an oscillation signal with at least one signal valley. An occurrence number of the signal valley is detected, and is compared with a lock number. When the occurrence number and the lock number fit a predetermined condition, the power switch is turned ON to start a cycle time at a start moment. Whether the start moment falls within an expectation window is checked. The lock number is changed if the start moment falls outside of the expectation window.

18 Claims, 6 Drawing Sheets

(56) References Cited

U.S. PATENT DOCUMENTS

2017/0214325 A1* 7/2017 Chang ............... H02M 3/33507
2017/0244327 A1* 8/2017 Leong .................... H02M 1/08

* cited by examiner

SWITCHING-MODE POWER SUPPLIES CAPABLE OF OPERATING AT VALLEY SWITCHING, AND RELEVANT CONTROL METHODS

CROSS-REFERENCE TO RELATED APPLICATION

This application claims priority to and the benefit of Taiwan Application Series Number 105102001 filed on Jan. 22, 2016, which is incorporated by reference in its entirety.

BACKGROUND

The present disclosure relates generally to switching-mode power supplies, and more particularly to switching-mode power supplies capable of performing valley switching.

A switching-mode power supply normally uses s power switch to control the current through an inductive device, such as an inductor or a transformer. In comparison with other types of power supplies, switching-mode power supplies generally benefit from compact product sizes and efficient power conversions, and are adopted by most of power supply manufactures.

Among a variety of switching-mode power supplies, some can operate in a quasi-resonance (QR) mode and are named as QR-mode power supplies. A QR-mode power supply could perform zero-voltage switching, meaning a power switch is turned ON substantially at the moment when a voltage across the power switch is zero or minimum, so switching loss of the power switch could be minimized in theory. A QR-mode power supply generally enjoys excellent power conversion especially when the load it drives is heavy.

FIG. 1 shows a QR-mode power supply 10 in the art, where a transformer is an inductive device with a primary winding PRM, a secondary winding SEC and an auxiliary winding AUX, inductively coupled to one another. The QR-mode power supply 10 converts the input voltage $V_{IN}$ into an output voltage $V_{OUT}$ and an output current $I_{OUT}$ to power a load 24. A QR power controller 26 provides at a node GATE pulse-width modulation (PWM) signal $V_{GATE}$ to periodically turn ON and OFF a power switch 34. Via voltage-dividing resistors 28 and 30, the QR power controller 26 detects winding voltage $V_{AUX}$ across the auxiliary winding AUX. FIG. 2 shows waveforms of PWM signal $V_{GATE}$, winding voltage $V_{AUX}$, valley signal $S_{QRD}$ and blanking signal $S_{BLANK}$. In FIG. 2, between two rising edges of the PWM signal $V_{GATE}$ is one cycle time $T_{CYC}$ consisting of one ON time $T_{ON}$ and one OFF time $T_{OFF}$, where an ON time $T_{ON}$ is a period of time when the power switch 34 is turned ON, and an OFF time $T_{OFF}$, in the opposite, is a period of time when the power switch 34 is turned OFF. As shown by the rear half of an OFF time $T_{OFF}$ in FIG. 2, because of the completion of demagnetization, the winding voltage $V_{AUX}$ starts oscillating to generate two signal valleys $VL_1$ and $VL_2$. The QR power controller 26 provides a valley signal $S_{QRD}$ which pulses each time when a signal valley is detected. The QR power controller 26 concludes the cycle time $T_{CYC}$ based upon the occurrence of the signal valley $VL_2$, and this kind of switching ON a power switch in response to the occurrence of a signal valley is commonly called as valley switching.

At a compensation node COMP of the QR-mode power supply 10 is a compensation voltage $V_{COMP}$ controlled by an operational amplifier 20 comparing the output voltage $V_{OUT}$ with a target voltage $V_{TAR}$. The compensation voltage $V_{COMP}$ substantially determines the durations of the ON time $T_{ON}$ and a blanking time $T_{BLANK}$, and the power controller 26 allows the cycle time $T_{CYC}$ to end after the blanking time $T_{BLANK}$. The blanking time $T_{BLANK}$ can avoid the QR-mode power supply 10 from suffering low power conversion because of a too-high switching frequency $f_{CYC}$ ($=1/T_{CYC}$). As demonstrated in FIG. 2, the blanking time $T_{BLANK}$ continues and does not end when the signal valley $VL_1$ appears, so the power switch 34 is still turned OFF. Nevertheless, the signal valley $VL_2$ appears when the blanking time $T_{BLANK}$ has concluded, and it makes the power switch 34 turned ON to start a next cycle time. A signal valley selected to perform valley switching is called a selected valley hereinafter, and in FIG. 2 it is the signal valley $VL_2$.

The QR-mode power supply 10 in the art could generate uncomfortable audible noise, however. For a constant load 24, the compensation voltage $V_{COMP}$ could vibrate, making the selected valley jump to and fro between two adjacent signal valleys, and resulting in an instable operation and noise in the transformer. Since a power supply operating with noise is hardly accepted in the market, the noise caused by the valley jump should be diminished or eliminated.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
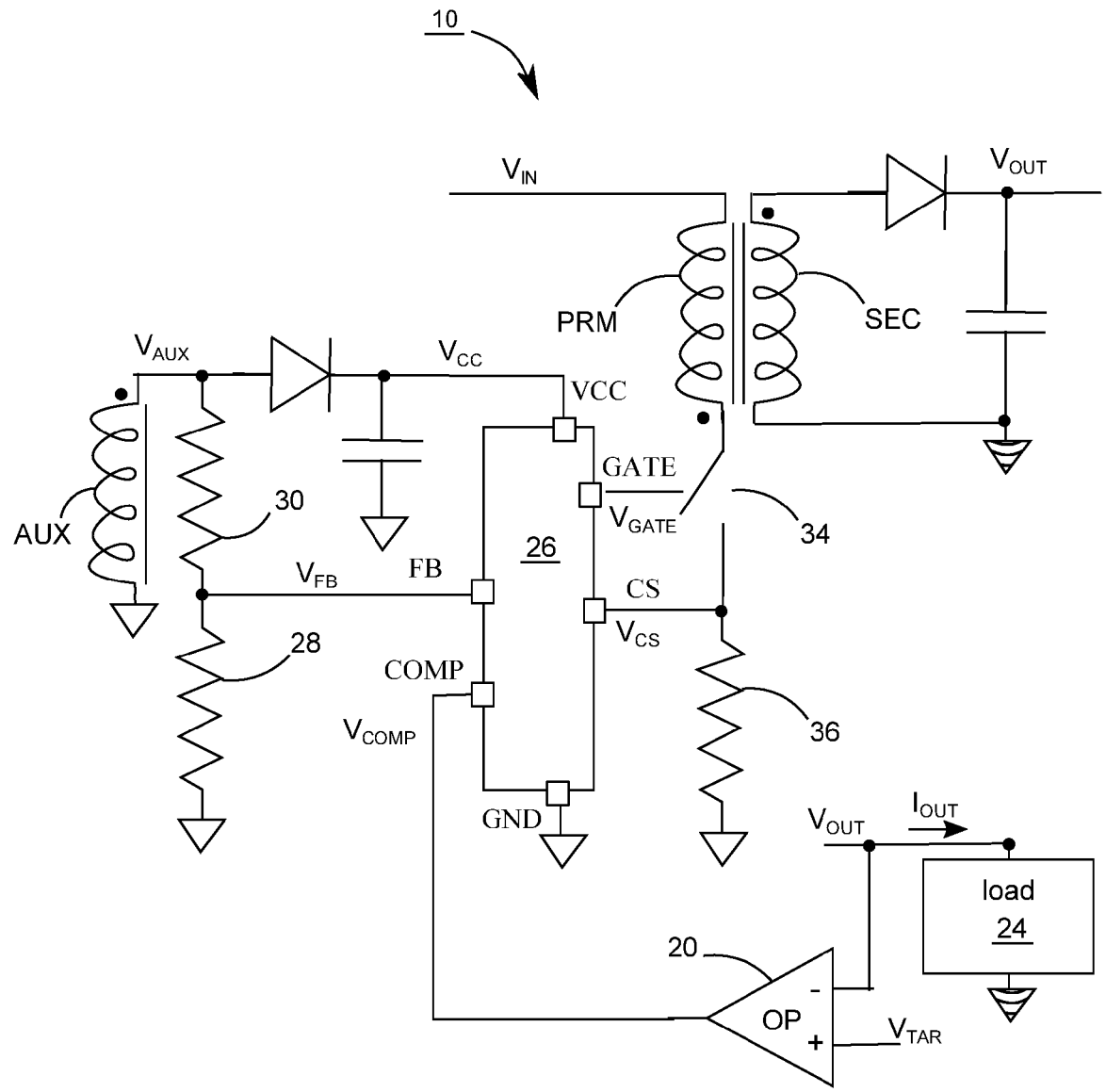
FIG. 1 shows a QR-mode power supply in the art.
Figure 2:
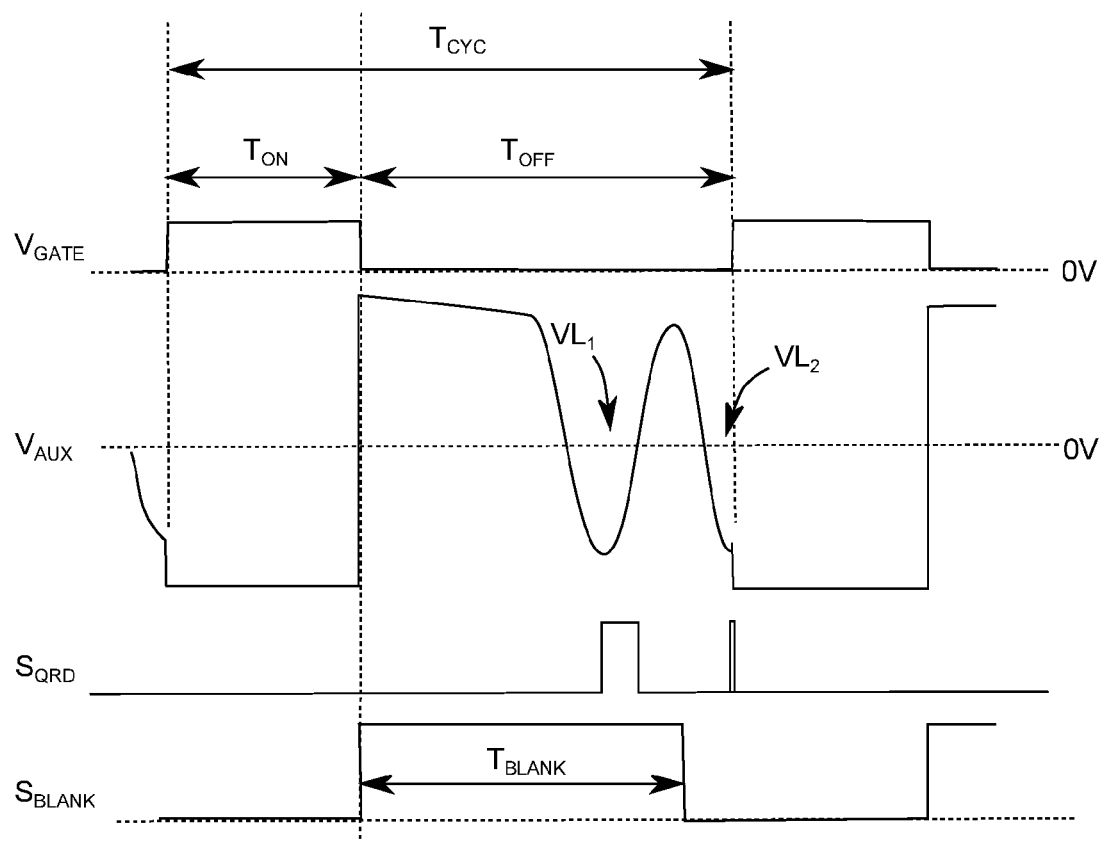
FIG. 2 shows waveforms of PWM signal $V_{GATE}$, winding voltage $V_{AUX}$, valley signal $S_{QRD}$ and blanking signal $S_{BLANK}$.
Figure 3:
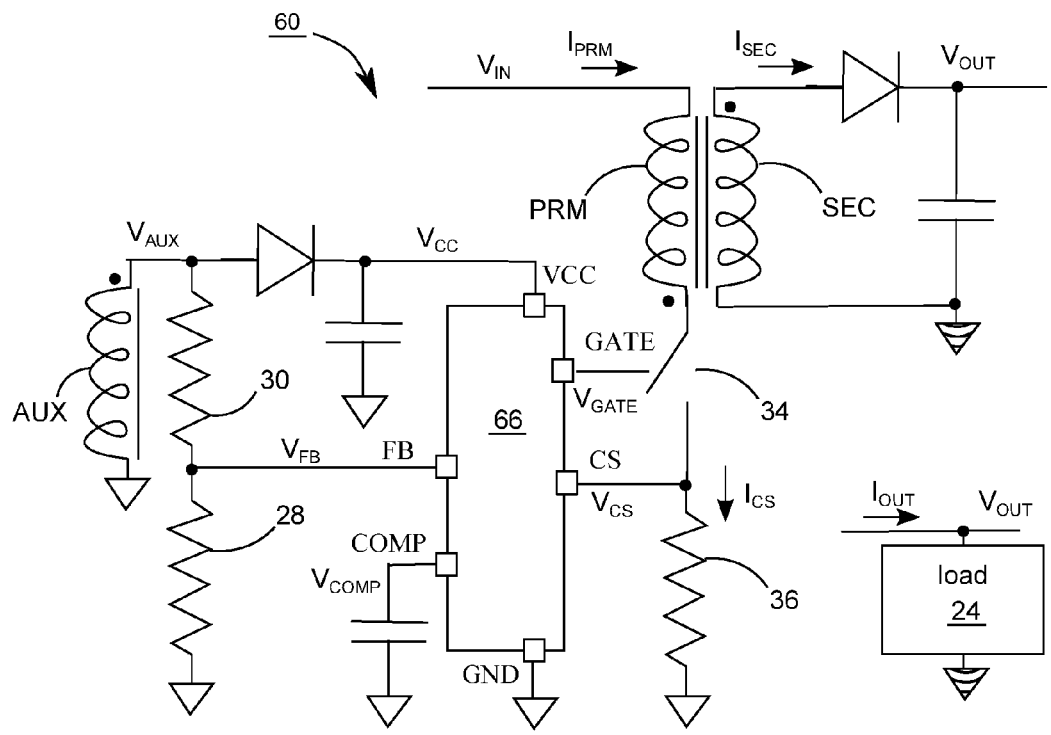
FIG. 3 demonstrates a switching-mode power supply according to embodiments of the invention.

FIG. 3 demonstrates a switching-mode power supply 60, where a power controller 66 could be an integrated circuit packaged with power pins VCC and GND, current-sense pin CS, compensation pin COMP, driving pin GATE, and feedback pin FB. Each pin could be deemed as a node in view of circuit diagram, and therefore all the pins of the power controller 66 are renamed as nodes in the following description. However, a node is not necessary to be a pin in this specification.

Once the power switch 34 is turned OFF and the transformer with the primary winding PRM, the secondary winding SEC and the auxiliary winding AUX completes demagnetization, the winding voltage $V_{AUX}$ starts oscillation and generates at least one signal valley. According to one embodiment of the invention, the power controller 66 provides a lock number, and detects the occurrence number of the signal valley via the feedback node FB, where the occurrence number of the signal valley refers to how many times the signal valley appears. After the occurrence number and the lock number fit a predetermined condition, the power controller 66 can select a signal valley for valley switching, so the power switch is turned ON to end a cycle time and start a following cycle time at a start moment. This predetermined condition could be, for example, the occurrence number is not less than the lock number according to one embodiment of the invention.

The start moment is checked whether it is within an expectation window. If the start moment falls within the expectation window, the present switching frequency seems appropriate and the lock number remains unchanged. If the start moment occurs ahead of the expectation window, meaning the following cycle time starts even though the expectation window has not started yet, the lock number increases, expecting to lengthen the duration of the next cycle time. So a start moment of a subsequent cycle time could be delayed to fall within the expectation window. In the other hand, if the start moment falls behind the expectation window, meaning the following cycle time does not start even though the expectation window has come to an end, the lock number decreases, expecting to shorten the duration of the next cycle time. A start moment of a subsequent cycle time could become earlier to fall within the expectation window.

Figure 4:
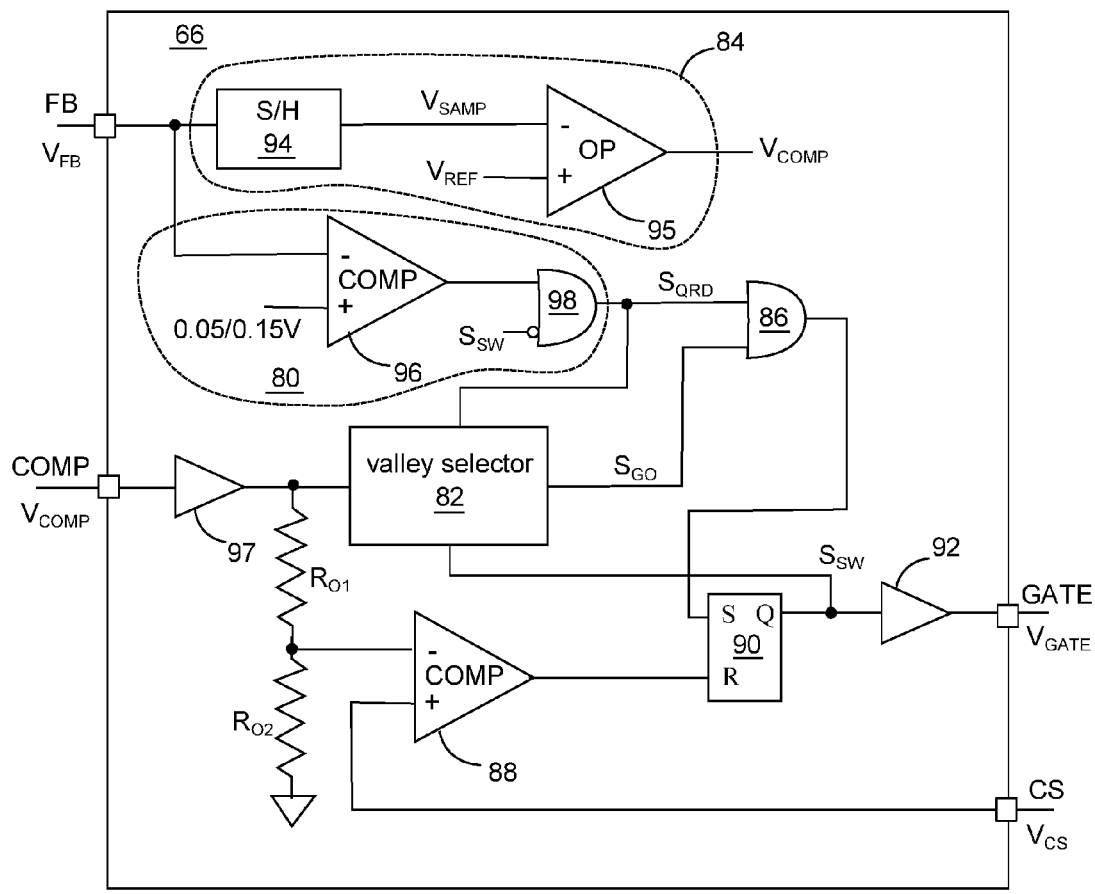
FIG. 4 demonstrates the power controller in FIG. 3.

FIG. 4 demonstrates the power controller 66 in FIG. 3, including a compensation-voltage generator 84, a valley detector 80, a valley selector 82 and a logic gate 86.

The compensation-voltage generator 84 includes a sample-and-hold (S/H) circuit 94 and an operational amplifier 95. During an OFF time $T_{OFF}$, the S/H circuit 94 samples the feedback voltage $V_{FB}$ at the feedback node FB to hold a voltage sample $V_{SAMP}$, which the operational amplifier 95 compares with a reference voltage $V_{REF}$ to drive the compensation node COMP, at which the compensation voltage $V_{COM}$ is generated. If the sampling is timely, the voltage sample $V_{SAMP}$ could be a representative of the output voltage $V_{OUT}$, so the compensation voltage $V_{COM}$ is generated by detecting the output voltage $V_{OUT}$ through the auxiliary winding AUX. The output voltage $V_{OUT}$ is sensed indirectly by the circuits in the primary side, and this kind of output voltage control is commonly called as primary side control (PSC). In another embodiment of the invention, a power supply controls a compensation voltage $V_{COMP}$ in response to an output voltage $V_{OUT}$ by way of secondary side control (SSC), which uses circuits in the secondary side to detect the output voltage $V_{OUT}$, and feeds the detection result to the primary side through an isolation device, an photo coupler for example, to affect the compensation voltage $V_{COMP}$, so the power switch 34 and the power converted are controlled.

A buffer 97, a unit amplifier for example, forwards compensation voltage $V_{COMP}$ to valley selector 82 and a resistor $R_{O1}$. The resistors $R_{O1}$ and $R_{O2}$ connected in series provide to the comparator 88 a voltage level in proportion to the compensation voltage $V_{COMP}$.

When the power switch 34 is turned ON, the current sense voltage $V_{CS}$ at the current-sense pin CS ramps up over time in a substantially linear manner. Once the current sense voltage $V_{CS}$ exceeds the voltage level provided from the resistors $R_{O1}$ and $R_{O2}$, the comparator 88 resets the SR register 90, which in response turns the power switch 34 OFF via a driver 92 and the driving node GATE. The input and the output of the driver 92 are PWM signals $S_{SW}$ and $V_{GATE}$, respectively. In view of their logic values, the PWM signals $S_{SW}$ and $V_{GATE}$ are substantially the same, even though they might have different voltage levels.

The valley detector 80, the valley selector 82 and the logic gate 86 in combination are coupled to the feedback node FB, for setting the SR register 90. When the SR register is set, it is the start moment $t_{CYC\text{-}STRT}$ of a next cycle time because the power switch 34 is turned ON, and it is also the end moment $T_{CYC\text{-}END}$ of the present cycle time because present cycle concludes.

The valley detector 80 compares the feedback voltage $V_{FB}$ at the feedback node FB with a reference voltage, which is about 0V for example. The valley detector 80 detects whether the winding voltage $V_{AUX}$ becomes below 0V, an indication a signal valley is happening, and the valley detector 80 in response provides a corresponding pulse as the valley signal $S_{QRD}$.

As will be detailed later, the valley selector 82 counts how many times pulses of the valley signal $S_{QRD}$ show up, to provide an occurrence number $N_{VLY}$. For example, if the occurrence number $N_{VLY}$ is currently 3, the $3^{rd}$ pulse of the valley signal $S_{QRD}$ has started and the $4^{th}$ pulse has not. Once the occurrence number $N_{VLY}$ and a lock number $N_{VLY\_LCK}$ from the valley selector 82 fit a predetermined condition, the valley selector 82 asserts a pass signal $S_{GO}$. For example, this condition could be the occurrence number $N_{VLY}$ is not less than the lock number $N_{VLY\_LCK}$. When the pass signal $S_{GO}$ is asserted, anyone pulse of the valley signal $S_{QRD}$ can go through the logic gate 86 to set the SR register 90, which in response makes driver 92 turn ON the power switch 34, performing valley switching. Accordingly, the moment when the power switch 34 is turned ON is referred to as a start moment $t_{CYC\text{-}STRT}$, at which the present cycle time ends and a next cycle time starts.

Theoretically, if the lock number $N_{VLY\_LCK}$ is X, the selected valley for performing valley switching should be the $X^{th}$ signal valley, meaning the start moment $t_{CYC\text{-}STRT}$ should be somewhere within the duration when the $X^{th}$ signal valley appears.

Figure 6:
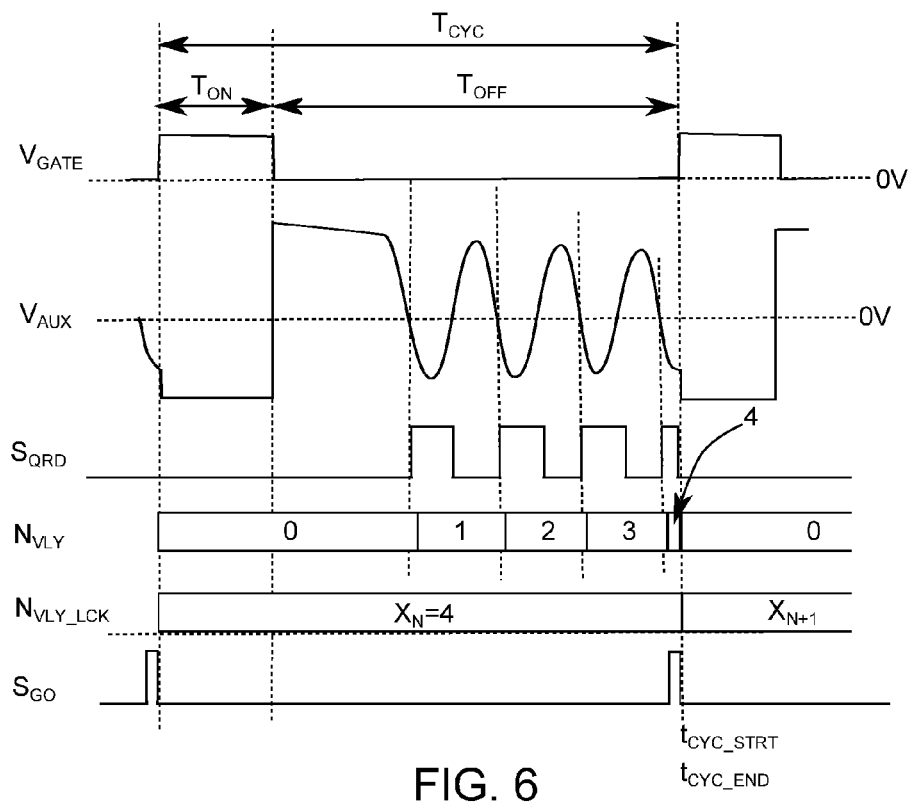
FIG. 6 illustrates timing diagrams explaining how a start moment $t_{CYC-STRT}$ is determined.
Figure 5:
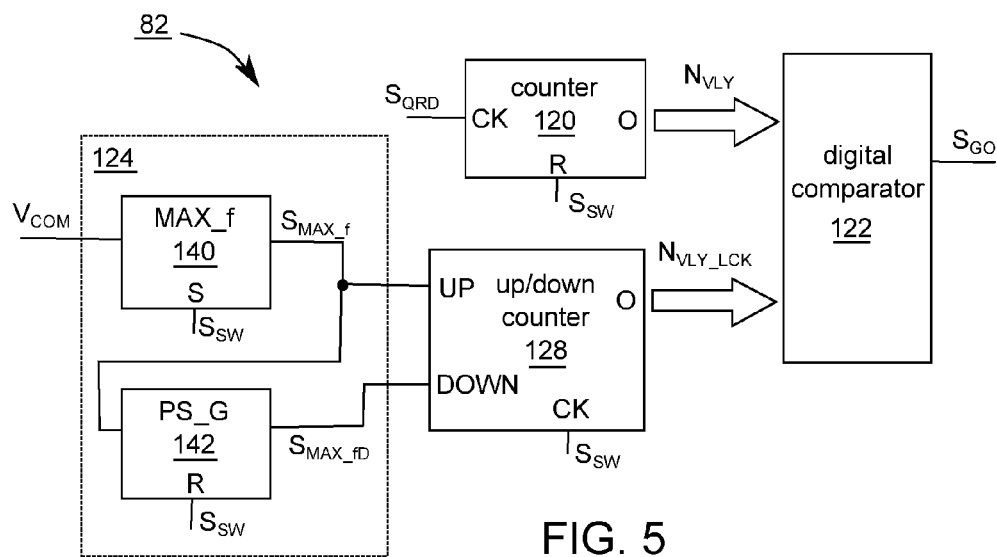
FIG. 5 demonstrates the valley selector in FIG. 4.

FIG. 5 demonstrates the valley selector 82 in FIG. 4, including a counter 120, a window generator 124, an up/down counter 128, and a digital comparator 122. Please refer to FIGS. 5 and 6, where FIG. 6 illustrates timing diagrams explaining how a start moment $t_{CYC\text{-}STRT}$ is determined. According to one embodiment of the invention, the lock number $N_{VLY\_LCK}$ from the up/down counter 128 has up and bottom limits as 7 and 0 respectively, meaning the up/down counter 128 could count up to not more than 7 and down to not less than 0. It is supposed in FIG. 6 that the lock number $N_{VLY\_LCK}$ is 4 when the present cycle time $T_{CYC}$ shown in FIG. 6 starts. During an ON time $T_{ON}$, the counter 120 is reset to have the occurrence number $N_{VLY}$ 0. An OFF time $T_{OFF}$ starts as the ON time $T_{ON}$ ends. The winding voltage $V_{AUX}$ is clamped to be about a constant at the beginning of the OFF time when the transform demagnetizes. As aforementioned, the winding voltage $V_{AUX}$ starts oscillating after the completion of demagnetization. Every time when the winding voltage $V_{AUX}$ falls below 0V, the valley signal $S_{QRD}$ in response provides a rising edge, which makes the counter 120 count up and the occurrence number $N_{VLY}$ increased by 1. The occurrence number $N_{VLY}$, therefore, represents how many signal valleys the winding voltage $V_{AUX}$ has shown in this present cycle time $T_{CYC}$. The digital comparator 122 compares the lock number $N_{VLY\_LCK}$ with the occurrence number $N_{VLY}$, and asserts the pass signal $S_{GO}$ when these two numbers are equal. As demonstrated in FIG. 6, the pass signal $S_{GO}$ is de-asserted as being logic "0" when the occurrence number $N_{VLY}$ is 0, 1, 2 or 3, but becomes asserted after the occurrence number $N_{VLY}$ is switched to be 4, equal to the lock number $N_{VLY\_LCK}$ No pulse of the valley signal $S_{QRD}$ can reach the SR register 90 in FIG. 4 when the pass signal $S_{GO}$ is de-asserted and so the logic gate blocks the valley signal $S_{QRD}$. When the pass signal $S_{GO}$ is asserted, a pulse of the valley signal $S_{QRD}$ propagates a period of delay time to set the SR register 90 in FIG. 4, and, at the start moment $t_{CYC\text{-}STRT}$, the present cycle time ends and a next cycle time starts.

Figure 7A:
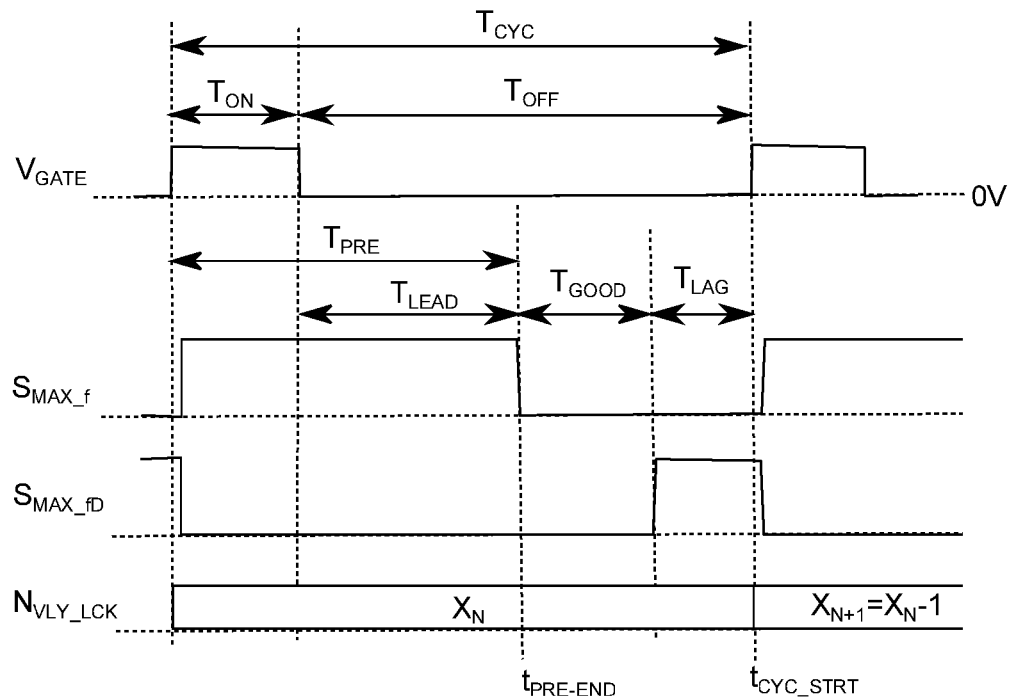
FIG. 7A illustrates a scenario when the start moment $t_{CYC-STRT}$ is behind the expectation window $T_{GOOD}$.

The window generator 124 determines the beginning and the duration of an expectation window $T_{GOOD}$. The up/down counter 128 checks whether the start moment $t_{CYC\text{-}STRT}$ falls within the expectation window $T_{GOOD}$, and, in response, determines the lock number $N_{VLY\_LCK}$ FIG. 7A illustrates a scenario when the start moment $t_{CYC\text{-}STRT}$ is behind the expectation window $T_{GOOD}$. It is supposed in FIG. 7A that the lock number $N_{VLY\_LCH}$ is an integer $X_N$ in the beginning of the present switching cycle $T_{CYC}$.

Refer to both FIGS. 5 and 7A. The window generator 124 has a lead time generator 140 and a delay generator 142. Based on the compensation voltage $V_{COMP}$, the lead time generator 140 provides a preparation signal $S_{MAX\text{-}f}$, which indicates an end moment $t_{PRE\text{-}END}$ of a preparation time $T_{PRE}$. When an ON time $T_{ON}$ starts the preparation signal $S_{MAX\text{-}f}$ is set to be "1" in logic, and at the end moment $t_{PRE\text{-}END}$ when the preparation time $T_{PRE}$ ends it becomes "0" in logic. The preparation time $T_{PRE}$ in FIG. 7A starts when the ON time $T_{ON}$ starts, but this invention is not limited to. Embodiments of the invention could have the preparation time $T_{PRE}$ start when the ON time $T_{ON}$ ends, for example. The delay generator 142 provides a delay signal $S_{MAX\text{-}fD}$, a step signal as shown in FIG. 7A, after a predetermined duration following the end moment $t_{PRE\text{-}END}$, and this predetermined duration is the expectation window $T_{GOOD}$. The delay signal $S_{MAX\text{-}fD}$ is reset to be "0" when the ON time $T_{ON}$ starts. As shown in FIG. 7A, the expectation window $T_{GOOD}$ follows right after the preparation time $T_{PRE}$, and ends when the delay signal $S_{MAX\text{-}fD}$ changes from "0" into "1". As demonstrated in FIG. 7A, an OFF time $T_{OFF}$ could be divided into three portions: a lead time $T_{LEAD}$, the expectation window $T_{GOOD}$, and a lag time $T_{LAG}$, where the lead time $T_{LEAD}$ is ahead of the expectation window $T_{GOOD}$ and the lag time $T_{LAG}$ behind.

Shown in FIG. 5, the preparation signal $S_{MAX\text{-}f}$ is forwarded to an UP terminal of the up/down counter 128, and the delay signal $S_{MAX\text{-}fD}$ to a DOWN terminal of the up/down counter 128. At the start moment $t_{CYC\text{-}STRT}$ when the PWM signal $S_{SW}$ has a rising edge, the up/down counter 128 determines whether the lock number $N_{VLY\_LCK}$ is changed based upon the logic levels of the preparation signal $S_{MAX\text{-}f}$ and the delay signal $S_{MAX\text{-}fD}$. For example, if the preparation signal $S_{MAX\text{-}f}$ is "1", the lock number $N_{VLY\_LCK}$ is increased by 1. If the delay signal $S_{MAX\text{-}fD}$ is "1", it is reduced by 1. If both the preparation signal $S_{MAX\text{-}f}$ and the delay signal $S_{MAX\text{-}fD}$ are "0", the lock number $N_{VLY\_LCK}$ remains unchanged.

Based on the aforementioned analyses, the lock number $N_{VLY\_LCK}$ determines the selected valley within which the start moment $t_{CYC\text{-}STRT}$ appears, and the selected valley could be in the $1^{st}$ signal valley, the $2^{nd}$ signal valley, or a further subsequent one. In FIG. 7A, the start moment $t_{CYC\text{-}STRT}$ happens while the preparation signal $S_{MAX\text{-}f}$ is "0" and the delay signal $S_{MAX\text{-}fD}$ are "1". It is determined that the start moment $t_{CYC\text{-}STRT}$ happens in the lag time $T_{LAG}$ behind the expectation window $T_{GOOD}$. So the lock number $N_{VLY\_LCK}$ is decreased by 1, changing from $X_N$ into $X_N$–1. As the lock number $N_{VLY\_LCK}$ decreases, the next cycle time is expected to end earlier, and a subsequent start moment $t_{CYC\text{-}STRT}$ could approach or fall within the expectation window $T_{GOOD}$.

Figure 7B:
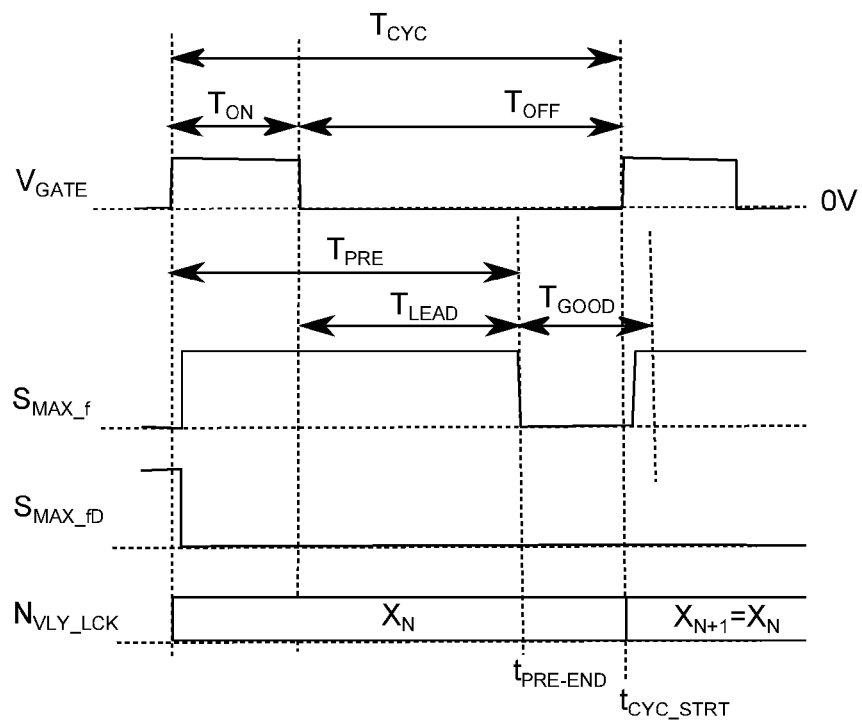
FIG. 7B illustrates a scenario when the start moment $t_{CYC-STRT}$ is within the expectation window $T_{GOOD}$.

FIG. 7B illustrates a scenario when the start moment $t_{CYC\text{-}STRT}$ is within the expectation window $T_{GOOD}$. Analogously, the lock number $N_{VLY\_LCK}$ in FIG. 7B is supposed to be an integer $X_N$ in the beginning. The similarity of FIG. 7B to FIG. 7A is self-explanatory based upon the aforementioned teaching, and is not redundantly detailed.

In FIG. 7B, the start moment $t_{CYC\text{-}STRT}$ happens when the preparation signal $S_{MAX\text{-}f}$ and the delay signal $S_{MAX\text{-}fD}$ are both "0". It implies the start moment $t_{CYC\text{-}STRT}$ happens while the expectation window $T_{GOOD}$ has not ended yet. Therefore, the start moment $t_{CYC\text{-}STRT}$ is within the expectation window $T_{GOOD}$, and the lock number $N_{VLY\_LCK}$ remains as $X_N$ for the next switching cycle.

Figure 7C:
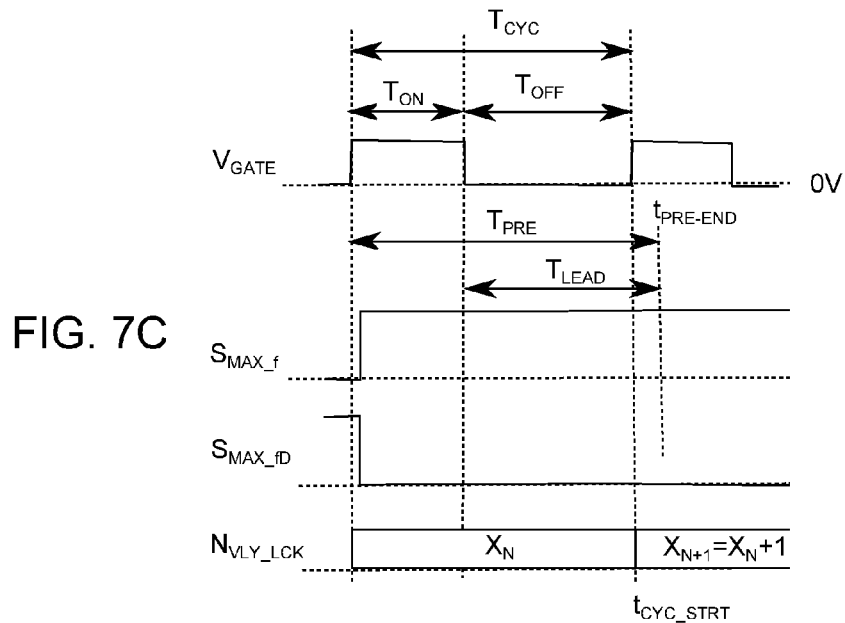
FIG. 7C illustrates a scenario when the start moment $t_{CYC-STRT}$ is ahead of the expectation window $T_{GOOD}$.

FIG. 7C illustrates a scenario when the start moment $t_{CYC\text{-}STRT}$ is ahead of the expectation window $T_{GOOD}$ Analogously, the lock number $N_{VLY\_LCK}$ in FIG. 7C is supposed to be an integer $X_N$ in the beginning. The similarity of FIG. 7C to FIGS. 7A and 7B is self-explanatory based upon the aforementioned teaching, and is not redundantly detailed.

In FIG. 7C, the start moment $t_{CYC\text{-}STRT}$ happens when the preparation signal $S_{MAX\text{-}f}$ is "1" and the delay signal $S_{MAX\text{-}fD}$ is "0". It implies the start moment $t_{CYC\text{-}STRT}$ happens while the expectation window $T_{GOOD}$ has not started. Therefore, the start moment $t_{CYC\text{-}STRT}$ is within the lead time $T_{LEAD}$ ahead of the expectation window $T_{GOOD}$. So the lock number $N_{VLY\_LCK}$ is increased by 1, changing from $X_N$ into $X_N$+1. As the lock number $N_{VLY\_LCK}$ increases, the next cycle time is expected to end later, and a subsequent start moment $t_{CYC\text{-}STRT}$ could approach or fall within the expectation window $T_{GOOD}$.

In embodiments of the invention, the compensation voltage $V_{COMP}$ determines the duration of the preparation time $T_{PRE}$ but the expectation window $T_{GOOD}$ is a constant in length. For example, when the compensation voltage $V_{COMP}$ increases because of an increment to the load 24, the preparation time $T_{PRE}$ becomes shorter and the length of the expectation window $T_{GOOD}$ remains the same. In other words, the preparation time $T_{PRE}$ is determined in response to the compensation voltage $V_{COMP}$, and the duration of the expectation window $T_{GOOD}$ is independent from the compensation voltage $V_{COMP}$. The compensation voltage $V_{COMP}$ determines the beginning of the expectation window $T_{GOOD}$, but not the duration of the expectation window $T_{GOOD}$.

In some embodiments of the invention, the compensation voltage $V_{COMP}$ determines both the durations of the preparation time $T_{PRE}$ and the expectation window $T_{GOOD}$. For example, when the compensation voltage $V_{COMP}$ increases, the preparation time $T_{PRE}$ becomes shorter and the expectation window $T_{GOOD}$ becomes wider.

Figure 8:
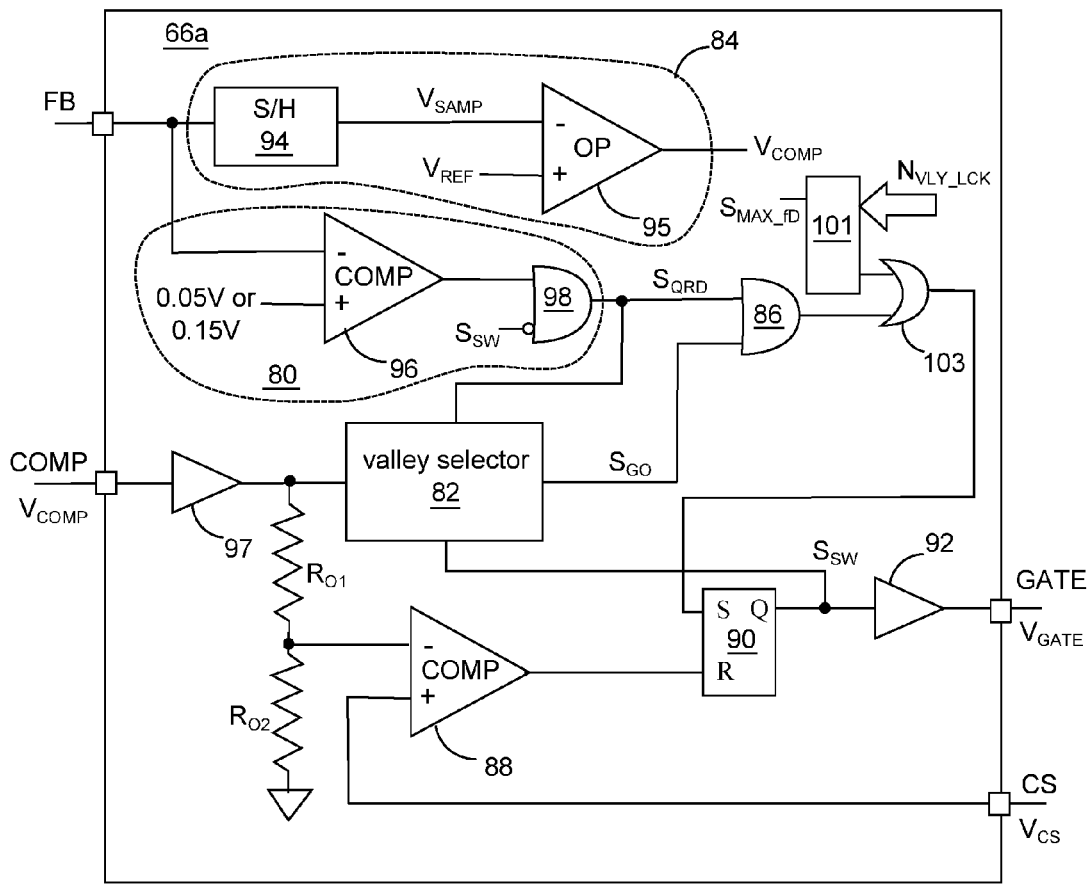
FIG. 8 shows another power controller according to embodiments of the invention.

If the lock number $N_{VLY\_LCK}$ is 0, the bottom limit, the power controller 66 in FIG. 4 will always select the 1st signal valley to perform valley switching. This invention is not limited to however. FIG. 8 shows another power controller 66a, capable of replacing the controller 66 according to embodiments of the invention.

The similarity of the power controller 66a in FIG. 8 to the power controller 66 in FIG. 4 is self-explanatory based upon the aforementioned teaching, and is not redundantly detailed. In comparison with the power controller 66, the power controller 66a additionally has an OR gate 103 and a CCM controller 101. The CCM controller 101 has inputs for the delay signal $S_{MAX-fD}$ and the lock number $N_{VLY\_LCK}$, and an output to the OR gate 103. Every time when an ON time $T_{ON}$ starts, the output of the CCM controller 101 is reset to be "0" in logic.

When the lock number $N_{VLY\_LCK}$ is not 0, the CCM controller 101 is configured to have its output "0" in logic all the time, and the power controller 66a operates exactly the same as the power controller 66 in FIG. 4 does.

When the lock number $N_{VLY\_LCK}$ is 0, the CCM controller 101 passes the delay signal $S_{MAX-fD}$, which could go through the OR gate 103 to set the SR register 90 and turn the power switch 34 ON. If the 1st pulse of the valley signal $S_{QRD}$ happens earlier than the rising edge of the delay signal $S_{MAX-fD}$ does, the power controller 66a will select the 1st signal valley to perform valley switching, just like the power controller 66 does. If in the opposite the rising edge of the delay signal $S_{MAX-fD}$ happens earlier than the 1st pulse of the valley signal $S_{QRD}$ does, the power controller 66a will turn the power switch 34 ON right after the expectation window $T_{GOOD}$ ends at the rising edge of the delay signal $S_{MAX-fD}$, possibly making a corresponding power supply operate in a continuous conduction mode (CCM) mode instead of a QR mode.

Based on the aforementioned analyses, if the load 24 in FIG. 3 is stable, the power controller 66 could make the switching-mode power supply 60 operate in a QR mode, the selected valley determined by the lock number $N_{VLY\_LCK}$, and the start moment $t_{CYC-STRT}$ fall within the expectation window $T_{GOOD}$. The selected valley won't change if the lock number $N_{VLY\_LCK}$ remains the same, so the troublesome audible noise might not happen. Change to the load 24 could affect the output voltage $V_{OUT}$ and the compensation voltage $V_{COMP}$, and in response, the expectation window $T_{GOOD}$ shifts and varies. The power controller 66 will modify the lock number $N_{VLY\_LCK}$ if the start moment $t_{CYC-STRT}$ falls outside the expectation window $T_{GOOD}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for use of a power supply with an inductive device and a power switch, wherein when the power switch is OFF a winding voltage of the inductive device oscillates to provide an oscillation signal with at least one signal valley, the control method comprising:
   providing a lock number;
   detecting an occurrence number of the signal valley;
   comparing the lock number with the occurrence number;
   when the occurrence number and the lock number fit a predetermined condition, turning the power switch ON to start a cycle time at a start moment;
   providing an expectation window;
   checking if the start moment falls within the expectation window; and
   changing the lock number if the start moment falls outside of the expectation window.

2. The control method as claimed in claim 1, wherein keeping the lock number unchanged if the start moment falls within the expectation window.

3. The control method as claimed in claim 1, wherein the step of providing the expectation window comprises:
   providing a preparation time;
   wherein the expectation window follows next to the preparation time.

4. The control method as claimed in claim 1, further comprising:
   turning ON the power switch right after the expectation window ends if the lock number is a predetermined minimum.

5. The control method as claimed in claim 4, wherein the power supply operates in a continuous conduction mode.

6. The control method as claimed in claim 1, further comprising:
   decreasing the lock number if the start moment occurs ahead of the expectation window; and
   increasing the lock number if the start moment occurs behind the expectation window.

7. The control method as claimed in claim 1, comprising:
   providing the expectation window in response to a compensation voltage; and
   generating the compensation voltage in response to an output voltage of the power supply.

8. The control method as claimed in claim 7, wherein the duration of the expectation window is independent from the compensation voltage.

9. A power controller suitable for use in a power supply with an inductive device and a power switch, wherein when the power switch is OFF the inductive device is capable of providing an oscillation signal with at least one signal valley, the power controller comprising:
   a valley detector coupled to the inductive device, for detecting the signal valley to provide a valley signal; and
   a valley selector receiving the valley signal, for counting an occurrence number of the signal valley, comparing the occurrence number with a lock number, and when the occurrence number and the lock number fit a predetermined condition, providing a pass signal that allows the valley signal to make the power switch turned ON so a cycle time starts at a start moment;
   wherein the valley selector checks if the start moment falls within an expectation window, and changes the lock number if the start moment falls outside of the expectation window.

10. The power controller as claimed in claim 9, further comprising a logic gate coupled to receive the pass signal and the valley signal, wherein when the occurrence number and the lock number fit the predetermined condition the valley signal passes through the logic gate to make the power switch turned ON.

11. The power controller as claimed in claim 9, wherein the valley selector comprises a lead time generator that provides a preparation time followed by the expectation window.

12. The power controller as claimed in claim 11, wherein the valley selector further comprises a delay generator generating a step signal to conclude the expectation window.

13. The power controller as claimed in claim 12, wherein the valley selector comprises an up/down counter coupled to the delay generator and the lead time generator, for providing the lock number.

14. The power controller as claimed in claim 9, wherein the valley selector comprises an up/down counter that counts up to increase the lock number when the start moment occurs behind the expectation window and counts down to decrease the lock number when the start moment occurs ahead of the expectation window.

15. The power controller as claimed in claim 9, wherein when the lock number is a predetermined minimum the power controller is capable of operating the power supply in a continuous conduction mode.

16. The power controller as claimed in claim 9, wherein the expectation window has a beginning determined by a compensation voltage in response to an output voltage of the power supply.

17. The power controller as claimed in claim 16, wherein the expectation window has a duration independent from the compensation voltage.

18. The power controller as claimed in claim 16, wherein the compensation voltage is generated by detecting the output voltage through the inductive device.

\* \* \* \* \*